April 29, 1941.　　B. H. BENSON ET AL　　2,240,169
PNEUMATIC TIRE
Filed March 1, 1939　　2 Sheets-Sheet 2
Fig.4.
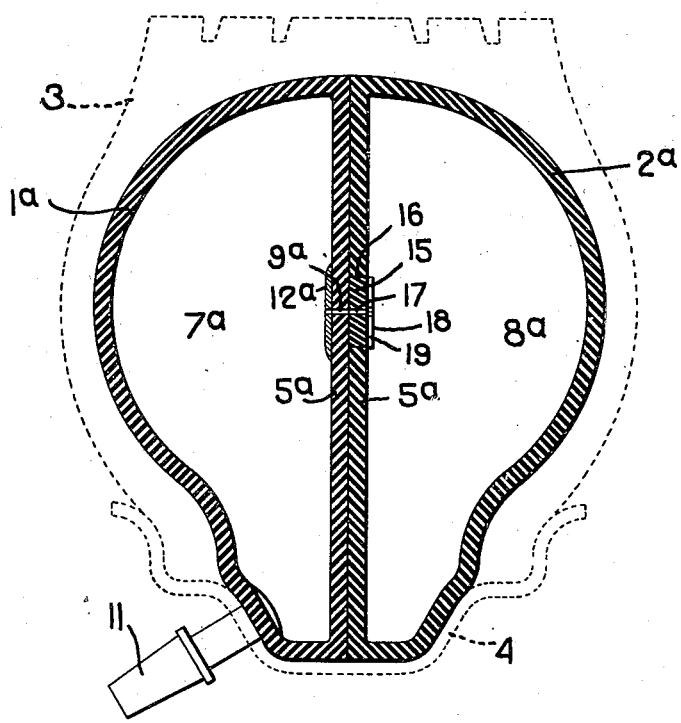
Fig.5.　　Fig.6.　　Fig.7.
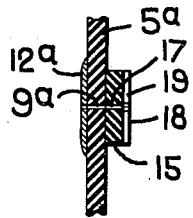 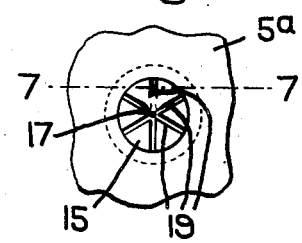 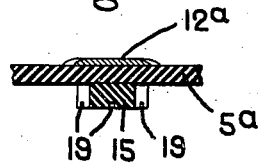
Inventors.
Benjamin H. Benson
Bernard E. Mendelsohn
by Heard Smith & Tennant.
Attys.

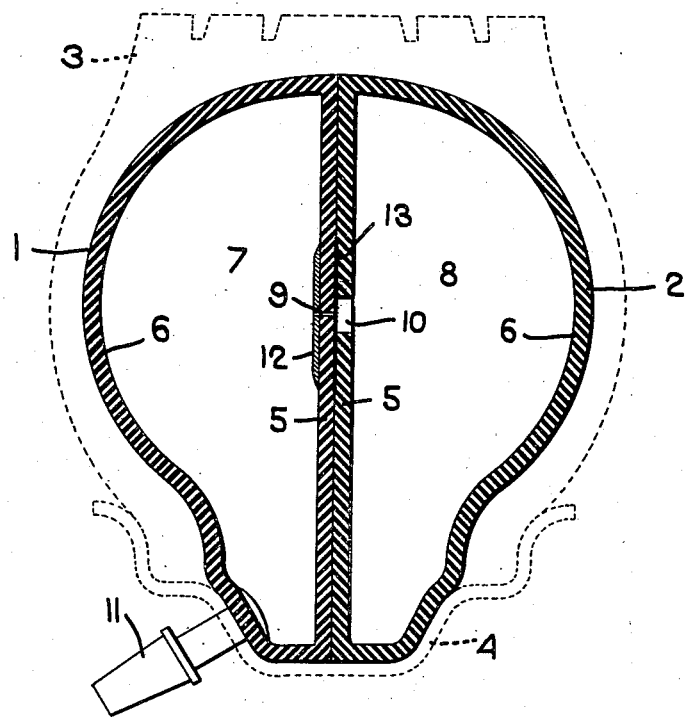
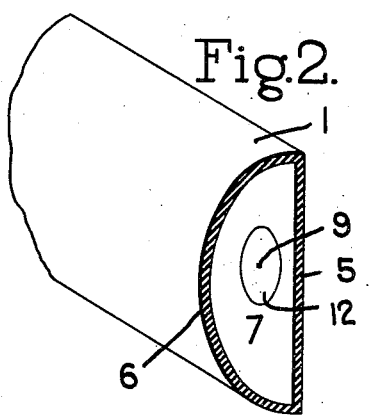
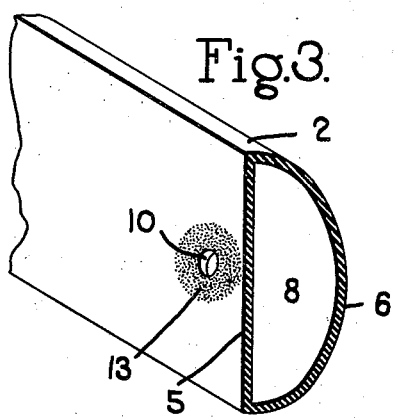

Patented Apr. 29, 1941

2,240,169

UNITED STATES PATENT OFFICE 2,240,169

PNEUMATIC TIRE

Benjamin Howard Benson and Bernard E. Mendelsohn, Brookline, Mass.

Application March 1, 1939, Serial No. 259,180

1 Claim. (Cl. 152—341)

This invention relates to inner tubes for pneumatic tires, and particularly to inner tubes of the twin-tube type which are constructed to provide a constantly open leak port or passage between the two tube sections so that in case one of the tube sections becomes deflated by a puncture or a blowout, there will be a delayed deflation of the other tube section, thus giving the driver of the automobile time to bring it to rest before complete deflation takes place.

One of the objects of our present invention is to provide a novel construction by which the constantly open leak port, which constitutes a constantly open communication between the tube sections, is formed by registering naked leak holes in the contacting walls of the two tube sections, said leak holes being held in registering relation by the cementing together of the mating walls of the tube sections circumjacent said holes. Another object of the invention is to provide a novel construction which facilitates the registration of the naked leak holes when the tube sections are being assembled in their twin-tube relation.

In accordance with the present invention, this constantly open leak passage is formed directly in the contacting walls of the tube sections and without the use of nipples, buttons or other similar adjuncts which necessarily increase the cost of manufacture of the tire.

In the drawings wherein we have illustrated some selected embodiments of our invention;

Fig. 1 is a sectional view through an inner tube made in accordance with our invention, the tube casing being shown in dotted lines;

Figs. 2 and 3 are fragmentary sectional perspective views illustrating the portions of the two tube sections which have the leak holes therein;

Fig. 4 is a view similar to Fig. 1 showing a different embodiment of the invention;

Fig. 5 is a fragmentary sectional view showing a portion of one of the tube sections;

Fig. 6 is a face view of Fig. 5;

Fig. 7 is a section on the line 7—7, Fig. 6.

In the drawings, the twin tube sections of the inner tire are indicated at 1 and 2 respectively. These two tube sections combined constitute the inner tube of the tire and are shown located within a tire casing 3 which is mounted on a rim 4 as usual in pneumatic tires, the tire casing and the rim being shown in dotted lines.

The two tube sections 1 and 2 may be initially made to have any desired cross-sectional shape, but we will preferably make these tube sections with a D-shape in cross-section, each tube section having a flat wall portion 5 and a rounded wall portion 6. When the tube sections are assembled within the casing 3, the flat wall portions 5 thereof are in mating contacting relation. The complete inner tube will thus be formed with two air chambers 7 and 8, each of which extends clear around the tire.

The two tube sections 1 and 2 are made separately and are then assembled to form the inner tube of the tire.

As stated above, the invention relates to that known type of twin-tube inner tube which is formed with a constantly open communication between the two air chambers 7 and 8.

In accordance with the present invention, this constantly open leak passage is formed by providing the walls 5 of each of the tube sections 1 and 2 with a naked leak hole which registers with that formed in the other wall 5.

The wall 5 of the tube section 1 is shown as having a small leak hole 9 extending therethrough, such leak hole being formed directly in the rubber of the wall 5. The wall 5 of the tube section 2 also has a registering leak hole 10 formed directly in the rubber of the wall, said leak hole 10 registering with the leak hole 9.

In order to hold the registering leak holes 9 and 10 in registering relation, we propose to cement or unite together the contacting faces of the mating walls 5 in a zone circumjacent the leak holes 9 and 10. In Fig. 3 the stippled portion of the outer face of the wall 5 of the tube section 2 represents the portion of said wall which is cemented or otherwise united to the wall 5 of the tube section 1. These tube sections may be united in this zone immediately surrounding the leak holes by applying a suitable cement to the portion of the outer face of each wall 5 immediately circumjacent the leak hole so that when the two tube sections are assembled with each other with the leak holes in registering relation, said tube sections will become cemented or otherwise united throughout this zone.

In the preferred embodiment of the invention the leak hole in one of the tube sections is made larger than that of the other tube section so as to make it easier to maintain the registering relation of the leak holes while the two portions of the two walls 5 circumjacent the holes are being cemented together. In the construction shown in Fig. 1, the hole 10 in the wall 5 of the tube section 2 is made larger than the leak hole 9 in the tube section 1. With this construction, the effective size of the leak passage is determined by the size of the smaller leak hole 9. The use of the larger leak hole in one of the walls 5 permits some latitude in the relative position of the walls 5 as the portions circumjacent the leak holes are being cemented together without destroying the registering relation between the leak holes. If the leak hole in the wall 5 of the tube section 2 were only as large as the leak hole 9 in the section 1, it would be difficult to assemble the two tube sections in their mating relation and with the small leak holes in exact registry, but this operation of cementing the two walls 5 together with the leak holes 9 and 10 registering with each other is greatly facilitated by having the leak hole 10 larger than the leak hole 9.

One of the tube sections, preferably the tube section 1 having the smaller leak hole 9, is provided with the usual inflating valve indicated at 11 by which the inner tube is inflated. Since the two chambers 7 and 8 have a constantly open communication through the registering leak holes 9 and 10, the tube can be inflated through the inflation valve 11, because the air which is introduced into the chamber 7 will leak through the leak port into the chamber 8 and ultimately the pressure in both chambers will be equalized so that the two walls 5 will assume a central portion within the tire.

If either chamber 7 or 8 becomes suddenly deflated by a blowout or a puncture, the air within the other chamber will suffice to hold up the tire and although there will be a slow leakage of air from the undamaged tube section into the other, yet the restricted leak opening will delay complete deflation of the other tube section until the driver of the car has had ample time to bring the car to rest.

In the construction illustrated in Fig. 1, the wall 5 of the tube section 1 is provided with suitable reinforcement 12 at the point where the small hole 9 is located and this reinforcement serves to maintain the constantly open condition of said small leak hole and also to obviate danger that the wall 5 will become torn at the small leak hole during inflating or deflating of the tire. This reinforcement also prevents the small leak hole from expanding as the inner tube stretches, or from closing up to an extent to prevent proper functioning.

In Fig. 4, we have shown a construction wherein the two tube sections are indicated at 1a and 2a, and the tube section 1a is provided with a small leak port 9a. In this embodiment, the wall 5a of the tube section 1a is provided on its exterior face with a reinforcing member 15 which surrounds the leak port 9a, said reinforcing member being cemented or vulcanized to the wall 5a.

The other tube section 2a is provided in its wall 5a with an opening 16 of a size to receive the reinforcement 15 so that when the two tube sections are in assembled relation, the reinforcement 15 fills the opening 16 of the tube section 2a. This reinforcement 15 has a small opening 17 therein which registers with the small leak port 9a.

These tube sections 1a and 2a are held in their assembled relation by having at least the portion of the contacting walls of the two tube sections surrounding the leak port cemented together.

The reinforcement 15 serves to prevent the small leak port 9a from closing up and also serves to maintain its small or restricted diameter even when the tube section 1a is stretched. When the two tube sections 1a, 2a are assembled, as shown in Fig. 4, the reinforcement 15, which is permanently secured to the exterior of the wall 5a of the tube section 1a, becomes, in effect, part of the wall of the compartment 8a.

Although the leak port 17 through the reinforcement 15 is relatively small and of approximately the same size as the leak port 9a through the wall 5a, yet it is much easier to secure the relatively small reinforcement member 15 to the wall 5a with the leak ports 9a and 17 in exact register than it would to secure the wall 5a of the tube 2a with a leak hole therein as small as that shown at 17 to the wall 5a of the tube section 1a, and to maintain the two small leak holes in alinement during such operation. The provision of the reinforcement member 15, therefore, facilitates the securing together of the two tube sections and the maintenance of the leak holes in registry with each other during this operation.

We will preferably make the reinforcement 15 slightly thicker than the wall 5a of the tube section 2a so that when the sections are assembled, the inner face 18 of the reinforcement projects slightly beyond the inner face of the wall 5a. This inner face 18 of the reinforcement 15 is shown as being provided with grooves 19 which radiate from the opening 17. The purpose of these grooves is to prevent the closing of the leak port by the engagement of the wall 5a of the tube section 2a with the outer wall of said section when the latter is deflated by a puncture or a blowout. If said section 2a is thus deflated, the two-ply partition comprising the two walls 5a will move over against one side of the tire, but since the reinforcement 15 is slightly thicker than the wall 5a, said grooved face 18 of the reinforcement will engage the side wall of the tire and the grooves 19 thus will provide open passages through which the air in the undamaged tube section 1a can slowly escape.

In the construction shown in Fig. 4, the wall 5a of the tube section 1a is also shown as having an interior reinforcement 12a which is provided on its exposed face with radial grooves which function similar to the grooves 19 if the tube section 1a is deflated.

We claim:

An inner tube for a pneumatic tire comprising twin-tube sections having mating walls in contact with each other, the mating wall of one tube section having an unobstructed naked leak hole therethrough, and also having a reinforcement permanently secured to its exterior face surrounding the leak hole and provided with a continuation of said leak hole, the mating wall of the other tube section having an opening therethrough in which said reinforcement is received, said reinforcement being thicker than the last named mating wall and extending slightly beyond the inner face thereof, the inner face of the reinforcement having radial grooves communicating with the leak hole, the contacting faces of said mating walls being cemented together in a zone immediately surrounding the leak hole.

BENJAMIN HOWARD BENSON.
BERNARD E. MENDELSOHN.